(12) United States Patent
Berbee et al.

(10) Patent No.: US 8,871,876 B2
(45) Date of Patent: Oct. 28, 2014

(54) ETHYLENE-BASED INTERPOLYMERS AND PROCESSES TO MAKE THE SAME

(75) Inventors: Otto J. Berbee, Hulst (NL); Roger G. Gagnon, Clute, TX (US); Mark Jasek, Clute, TX (US); Laura Nunez, Lake Jackson, TX (US); Bryan Gutermuth, Angleton, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/876,280

(22) PCT Filed: Sep. 21, 2011

(86) PCT No.: PCT/US2011/052509
§ 371 (c)(1),
(2), (4) Date: Mar. 27, 2013

(87) PCT Pub. No.: WO2012/044503
PCT Pub. Date: Apr. 5, 2012

(65) Prior Publication Data
US 2013/0184419 A1    Jul. 18, 2013

Related U.S. Application Data

(60) Provisional application No. 61/388,214, filed on Sep. 30, 2010.

(51) Int. Cl.
| | | |
|---|---|---|
| C08F 2/00 | (2006.01) | |
| C08F 210/00 | (2006.01) | |
| C08F 20/06 | (2006.01) | |
| C08F 116/34 | (2006.01) | |
| C08F 118/02 | (2006.01) | |
| B01J 19/24 | (2006.01) | |
| C08G 63/91 | (2006.01) | |
| C08F 2/01 | (2006.01) | |
| C08F 210/02 | (2006.01) | |
| C08F 110/02 | (2006.01) | |

(52) U.S. Cl.
CPC .............. C08F 2/01 (2013.01); C08F 110/02 (2013.01); C08F 210/02 (2013.01)
USPC .......... 526/64; 526/348; 526/317.1; 526/315; 526/319; 525/52; 525/411; 525/415

(58) Field of Classification Search
CPC .......... C08F 210/02; C08F 2/01; C08F 2/001; C08F 2/38; C08F 110/02; C08F 220/06; C08F 2500/11; C08F 2500/12; C08F 218/08
USPC .......... 526/64, 348, 317.1, 319, 315; 525/52, 525/411, 415
See application file for complete search history.

(56) References Cited

U.S. PATENT DOCUMENTS

| | | | |
|---|---|---|---|
| 2,964,515 A | 12/1960 | Rader | |
| 3,485,706 A | 12/1969 | Evans | |
| 3,536,693 A | 10/1970 | Schrader et al. | |
| 3,756,996 A | 9/1973 | Pugh et al. | |
| 3,913,698 A | 10/1975 | Gogins | |
| 4,322,027 A | 3/1982 | Reba | |
| 4,340,563 A | 7/1982 | Appel et al. | |
| 4,663,220 A | 5/1987 | Wisneski et al. | |
| 4,668,566 A | 5/1987 | Braun | |
| 4,988,781 A | 1/1991 | McKinney et al. | |
| 5,100,978 A | 3/1992 | Hasenbein et al. | |
| 5,384,373 A * | 1/1995 | McKinney et al. | ........... 526/212 |
| 5,911,940 A | 6/1999 | Walton et al. | |
| 6,407,191 B1 | 6/2002 | Mezquita et al. | |

FOREIGN PATENT DOCUMENTS

| | | |
|---|---|---|
| DE | 2107945 | 8/1972 |
| EP | 0318058 | 5/1989 |
| GB | 1578705 | 11/1980 |
| WO | 2005021622 | 3/2005 |
| WO | 2006049783 | 5/2006 |
| WO | 2010042390 | 4/2010 |
| WO | 2011075465 | 6/2011 |

OTHER PUBLICATIONS

International Preliminary Report on Patentability for PCT App. No. PCT/US2011/052525 issuance on Apr. 2, 2013.
International Preliminary Report on Patentability for PCT App. No. PCT/US2011/052509 issuance on Apr. 2, 2013.
Lee, Sang-Ho et al.. "Solubility of Poly(ethylene-co-acrylic acid) in Low Molecular Weight Hydrocarbons and Dimethyl Ether. Effect of Copolymer Concentration, Solvent Quality, and Copolymer Molecular Weight" J. Phys. Chem 1994, 98, 4055-4060.
Beyer, C. et al., "Cosolvent Studies with the system Ethylene/Poly-(ethylene-co-acrylic acid): Effects of Solvent, Density, Polarity, Hydrogen Bonding, and Copolymer Composition", Helvetica Chimica Acta vol. 85, 2002.
Hasch, B.M. et al., "The Effect of Copolymer Architecture on Solution Behavior", Fluid Phase Equilibria, 83 (1993) 341-348.
S. Goto et al.; "Computer Model for Commercial High Pressure Polyethylene Reactor Based on Elementary Reaction Rates Obtained Experimentally," Journal of Applied Polymer Science, Applied Polymer Symposium, 36, 21-40, 1981.
G. Mortimer; "Chain Transfer in Ethylene Polymerization," Journal of Polymer Science, Part A-1, vol. 4, pp. 881-900 (1966).

(Continued)

*Primary Examiner* — William Cheung
(74) *Attorney, Agent, or Firm* — Whyte Hirschboeck Dudek S.C.

(57) ABSTRACT

Ethylene-based interpolymers, e.g., ethylene-acrylic acid copolymers, are made by a process comprising the steps of: A. Injecting a first feed comprising a chain transfer agent system (CTA system) and ethylene into a first autoclave reactor zone to produce a first zone reaction product, the CTA system of the first reactor zone having a transfer activity Z1; and B. (1) Transferring at least part of the first zone reaction product to a second reactor zone selected from a second autoclave reactor zone or a tubular reactor zone, and (2) at least one of transferring or freshly injecting a feed comprising a CTA system into the second reactor zone to produce a second zone reaction product, the CTA system of the second reactor zone having a transfer activity of Z2; and with the proviso that the ratio of Z1:Z2 is greater than 1. The comonomer comprises at least one carboxylic acid group or an anhydride group.

11 Claims, No Drawings

(56) References Cited

OTHER PUBLICATIONS

G. Mortimer; "Chain Transfer in Ethylene Polymerization," Journal of Polymer Science, Part Iv, Additional Study at 1360 atm and 130° C., vol. 8, pp. 1513-1523 (1970).

G. Mortimer; "Chain Transfer in Ethylene Polymerization," Journal of Polymer Science, Part V, The Effect of Temperature, vol. 8, pp. 1535-1542 (1970).

G. Mortimer; "Chain Transfer in Ethylene Polymerization," Journal of Polymer Science, Part VII, Very Reactive and Depletable Transfer Agents, vol. 10, pp. 163-168 (1972).

McHugh et al., Solubility of Polyethylene-Co-Acrylic Acid) in Low Molecular Weight Hydrocarbons and Dimethylether. Effect of Copolymer Concentration, Solvent Quality, and Copolymer Molecular Weight, J Phys. Chem., 98 (1994), pp. 40555-4060.

* cited by examiner

ETHYLENE-BASED INTERPOLYMERS AND PROCESSES TO MAKE THE SAME

CROSS REFERENCE TO RELATED APPLICATION

The present application is the national phase of PCT Patent Application No. PCT/US2011/052509 filed Sep. 21, 2011, which claims priority to U.S. Provisional Application No. 61/388,214, filed Sep. 30, 2010, the entire content of which is incorporated by reference herein.

FIELD OF THE INVENTION

This invention relates new polymerization processes to make ethylene-based interpolymers, and to such interpolymers. Notably, the polymerization process involves one or more autoclave reactors, optionally operated with one or more tubular reactors.

BACKGROUND OF THE INVENTION

High molecular weight, normally solid copolymers of ethylene and unsaturated carboxylic acids, such as acrylic acid and methacrylic acid, are well known. However, there is a need for new ethylene copolymers which have improved film optics, while maintaining other performance attributes.

There are two main reactor types to produce high pressure free radical copolymers of ethylene and unsaturated carboxylic acids, namely the autoclave reactor and the tubular reactor. Generally a tubular reactor is more advantaged for making narrow molecular weight distribution (MWD) polyethylene due the uniform residence time in tubular reaction zones; however in case of the manufacturing of ethylenic-carboxylic acid copolymer a tubular reactor is less suited as a first reaction zone due to the following.

1. The requirement to preheat the reactor feed to a minimum start temperature to avoid phase separation.
2. The risk of premature carboxylic acid comonomer polymerization and consequently gel formation in the heating step of the reactor feed.
3. The high inlet acid comonomer concentration in a tubular reactor enhances the risk of phase separation.

For these reasons an autoclave or a hybrid autoclave-tubular reactor system is preferred for the production of acid high pressure copolymers. However due to broadening of the MWD by the residence time distribution in an autoclave reactor, this reactor type is less suited for making narrow MWD copolymer products.

Good optical properties are achieved by making a narrow MWD polymer. The MWD can be narrowed by polymerizing at lower temperatures and or higher operating pressure. Typically the maximum operating pressure is limited by the design of the compression and/or reaction section. In practice the MWD of a copolymer is narrowed by lowering polymerization temperature conditions. However lowering the polymerization temperature increases the risk of inducing phase separation conditions.

There remains a need for the production of narrow MWD ethylenic-carboxylic acid copolymer products with low gel levels, by suppressing phase separation and or hydrogen bonding of the carboxylic acid groups in the reactor. These needs and others have been met by the following invention.

SUMMARY OF THE INVENTION

In one embodiment, the invention is a high pressure polymerization process to form an ethylene-based interpolymer, the process comprising the steps of:

A. Injecting a first feed comprising a chain transfer agent system (CTA system) and ethylene into a first autoclave reactor zone operating at polymerization conditions to produce a first zone reaction product, the CTA system of the first reactor zone having a transfer activity Z1; and B. (1) Transferring at least part of the first zone reaction product to a second reactor zone selected from a second autoclave reactor zone or a tubular reactor zone and operating at polymerization conditions, and, optionally, (2) freshly injecting, a feed into the second reactor zone to produce a second zone reaction product, with the proviso that at least one of the first reactor zone product and the freshly injected feed comprises a CTA system with a transfer activity of Z2; and with the proviso that the ratio of Z1:Z2 is greater than 1, and wherein at least one comonomer is injected into the polymerization process at one or more of the flowing locations: at a suction to a hyper compressor, at a hyper compressor discharge, directly into a autoclave reactor at one or more zones, or directly into a tubular reactor at one or more zones, and wherein the at least one comonomer comprises at least one carboxylic acid group or an anhydride group.

In one embodiment, the high pressure polymerization process further comprises one or more steps of transferring a zone reaction product produced in an (ith–1) reaction zone to an (ith) reaction zone, where $3 \leq i \leq n$, and $n \geq 3$, each zone operating at polymerization conditions, and optionally adding an (ith) feed comprising a CTA system into the (ith) reaction zone, the CTA system of the (ith) reaction zone having a transfer activity of Zi with the proviso that the ratio of Z1/Zi is greater than 1.

The invention also provides an ethylene-based interpolymer comprising at least one comonomer that comprises at least one carboxylic acid group or an anhydride group, and wherein the polymer comprises at least one, preferably at least two, more preferably at least three, and even more preferably all of the following properties:

A. An average small gel count per 50,000 square inches ($in^2$) of less than or equal to 600, or 500, or 400, or 300;

B. An average micro gel count per 50,000 in2 of less than or equal to 3,500, or 3,000, or 2,500, or 2,000, or 1,500;

C. A percent by weight of acid comonomer units in the polymer chain from 2 to 30, or from 3 to 20, or from 4 to 15; and D. A molecular weight distribution (MWD, Mw/Mn) from 3 to 20, or from 4 to 16, or from 5 to 12.

DETAILED DESCRIPTION

Overview

As discussed above, the invention provides a high pressure polymerization process to form an ethylene-based interpolymer, the process comprising the steps of:

A. Injecting a first feed comprising a chain transfer agent system (CTA system) and ethylene into a first autoclave reactor zone operating at polymerization conditions to produce a first zone reaction product, the CTA system of the first reactor zone having a transfer activity Z1; and B. (1) Transferring at least part of the first zone reaction product to a second reactor zone selected from a second autoclave reactor zone or a tubular reactor zone and operating at polymerization conditions, and, optionally, (2) freshly injecting, a feed into the second reactor zone to produce a second zone reaction product, with the proviso that at least one of the first reactor zone product and the freshly injected feed comprises a CTA system with a transfer activity of Z2; with the provisos that:

the ratio of Z1:Z2 is greater than 1, and at least one comonomer is injected into the polymerization process at one or more of the flowing locations: at a suction to a hyper compressor, at a hyper compressor discharge, directly into a autoclave reactor at one or more zones, or directly into a tubular reactor at one or more zones, and the at least one comonomer comprises at least one carboxylic acid group or an anhydride group.

In one embodiment, the process further comprises one or more steps of transferring a zone reaction product produced in an (ith−1) reaction zone to an (ith) reaction zone, where $3 \leq i \leq n$, and $n \geq 3$, each zone operating at polymerization conditions, and injecting an (ith) feed comprising a CTA system into the (ith) reaction zone, the CTA system of the (ith) reaction zone having a transfer activity of Zi; and with the proviso that the ratio of Z1/Zi is greater than 1.

In one embodiment, a second feed is injected into the second reactor zone, and the second feed comprises ethylene.

In one embodiment, the second feed of the preceding embodiment further comprises a CTA system.

In one embodiment, the second feed is injected into the second reactor zone, and the second feed comprises ethylene but does not comprise a CTA system.

In one embodiment, the second feed of any of the preceding embodiments further comprises at least one comonomer.

In one embodiment, the ith feed of any of the preceding embodiments further comprises ethylene.

In one embodiment, the ith feed of any of the preceding claims further comprises at least one comonomer.

In one embodiment, the at least one comonomer of any of the preceding claims is selected from acrylic acid, methacrylic acid, or a combination thereof.

In one embodiment of any of the preceding embodiments, steps (B)(1) and (B)(2) are conducted simultaneously.

In one embodiment of any of the preceding embodiments, steps (B)(1) and (B)(2) are conducted at different times.

In one embodiment of any of the preceding embodiments, at least part of the first zone reaction product is transferred to a second autoclave reactor zone.

In one embodiment of any of the preceding embodiments, the second autoclave reactor zone is adjacent to the first autoclave reactor zone.

In one embodiment of any of the preceding embodiments, the second autoclave reactor zone is separated from the first autoclave reactor zone by one or more reactor zones.

In one embodiment of any of the preceding embodiments, at least part of the first zone reaction product is transferred to a tubular reactor zone.

In one embodiment of any of the preceding embodiments, the tubular reactor zone is adjacent to the first autoclave reactor zone.

In one embodiment of any of the preceding embodiments, the tubular reactor zone is separated from the first autoclave reactor zone by one or more reactor zones.

In one embodiment of any of the preceding embodiments, each feed to each reactor zone contains the same CTA system. In a further embodiment each CTA system comprises a single CTA.

In one embodiment of any of the preceding embodiments, at least one of the feeds to at least one of the reactor zones contains a CTA that is different from at least one of the CTAs to the other reactor zones. In a further embodiment at least one of the CTA systems comprises a single CTA.

In one embodiment of any of the preceding embodiments, each CTA is independently one of an olefin, an aldehyde, a ketone, an alcohol, a saturated hydrocarbon, an ether, a thiol, a phosphine, an amino, an amine, an amide, an ester, and an isocyanate.

In one embodiment of any of the preceding embodiments, each CTA is independently selected from an aldehyde, a ketone, or an alcohol.

In one embodiment of any of the preceding embodiments, the cloud point pressure of the polymerization is lowered more than the cloud point pressure of a similar polymerization that has the same process conditions except that the ratio of Z1:Z2 and/or Z1:Zi is less than or equal to 1.

In one embodiment of any of the preceding embodiments, the CTA prevents phase separation of the polymerization mixture.

In one embodiment of any of the preceding embodiments, at least one CTA has a chain transfer constant Cs greater than 0.002.

In one embodiment of any of the preceding embodiments, all autoclave zones are located in the same autoclave reactor.

In one embodiment of any of the preceding embodiments, the autoclave zones are located in two or more different autoclave reactors.

In one embodiment of any of the preceding embodiments, the autoclave zones are of about the same size.

In one embodiment of any of the preceding embodiments, two or more of the autoclave zones are of different sizes.

In one embodiment of any of the preceding embodiments, the polymerization conditions in each reactor zone are operated at the same temperature and same pressure.

In one embodiment of any of the preceding embodiments, at least one polymerization condition in at least one reactor zone is different from the other polymerization conditions.

In one embodiment of any of the preceding embodiments, each of the polymerization conditions in the reactor zones, independently, comprises a temperature greater than, or equal to, 100° C., and a pressure greater than, or equal to, 100 MPa.

In one embodiment of any of the preceding embodiments, each of the polymerization conditions in the reactor zones, independently, comprises a temperature less than 400° C., and a pressure less than 500 MPa.

In one embodiment of any of the preceding embodiments, the ratio Z1/Z2 and each ratio Z1/Zi are greater than 1.03.

In one embodiment of any of the preceding embodiments, the ratio Z1/Z2 and each ratio Z1/Zi are greater than 1.1.

In one embodiment of any of the preceding embodiments, the ratio Z1/Z2 and each ratio Z1/Zi are less than 10.

In one embodiment, an ethylene-based interpolymer is made by a process of any of the previous process embodiments.

In one embodiment the ethylene-based interpolymer comprises at least one comonomer that comprises at least one carboxylic acid group or an anhydride group, and wherein the interpolymer has an average small gel count per 50,000 square inches ($in^2$) of less than or equal to 600, or 500, or 400, or 300.

In one embodiment the ethylene-based interpolymer comprises at least one comonomer that comprises at least one carboxylic acid group or an anhydride group, and wherein the interpolymer has an average micro gel count per 50,000 square inches ($in^2$) of less than or equal to 3,500, or 3,000, or 2,500, or 2,000, or 1,500.

In one embodiment the ethylene-based interpolymer comprises at least one comonomer that comprises at least one carboxylic acid group or an anhydride group, and wherein the interpolymer has a percent by weight of acid comonomer units in the polymer chain from 2 to 30, or from 3 to 20, or from 4 to 15.

In one embodiment the ethylene-based interpolymer comprises at least one comonomer that comprises at least one carboxylic acid group or an anhydride group, and wherein the interpolymer has a molecular weight distribution (MWD, Mw/Mn) from 3 to 20, or from 4 to 16, or from 5 to 12.

In one embodiment of any of the preceding ethylene-based interpolymer embodiments, the interpolymer comprises at least two, or at least three, or all of the average small gel count, average micro gel count, acid content and MWD properties.

In one embodiment of any of the preceding interpolymer embodiments, the interpolymer comprises greater than, or equal to, 1 weight percent of a comonomer, based on the weight of the interpolymer.

In one embodiment the invention is a composition comprising the ethylene-based interpolymer of any of interpolymer embodiments.

In one embodiment the composition of the previous composition embodiment further comprises another ethylene-based polymer.

In one embodiment the invention is an article comprising at least one component formed from the ethylene-based interpolymer of any of the interpolymer embodiments.

In one embodiment the invention is an article comprising at least one component formed from a composition of any one of the preceding composition embodiments.

In one embodiment the article is a film comprising at least one polymer of any of the preceding polymer embodiments.

In one embodiment the article is a film comprising at least one component formed from a composition of any of the preceding composition embodiments.

Polymerizations

For a high pressure, free radical initiated polymerization process, two basic types of reactors are known. In the first type, an agitated autoclave vessel having one or more reaction zones is used. In the second type, a jacketed tube is used as reactor, which tube has one or more reaction zones. The high pressure process of the present invention to produce ethylene-based interpolymers comprising an acid group can be carried out in an autoclave reactor having at least two reaction zones or in a combination of an autoclave and a tubular reactor. The process of this invention, i.e., the separate introduction of the CTA system at different locations in the reactor system and maintaining a Z1:Z2 ratio greater than 1, prevents phase separation and, this in turn, reduces gel formation by reducing the cloud point pressure of the polymerization system. Moreover, the CTA can act as a co-solvent for the system.

The temperature in each autoclave and tubular reactor zone of the process is typically from 100 to 400, more typically from 150 to 350 and even more typically from 160 to 320,° C. The pressure in each autoclave and tubular reactor zone of the process is typically from 100 to 400, more typically from 120 to 360 and even more typically from 150 to 320, MPa. The high pressure values used in the process of the invention have a direct effect on the amount of chain transfer agent, for example acetone, methyl ethyl ketone (MEK) or propionaldehyde, incorporated in the polymer. The higher the reaction pressure is, the more chain transfer agent derived units are incorporated in the product.

In one embodiment of the process of the invention, a combination of an autoclave comprising at least two reaction zones and a conventional tubular reactor having at least one reaction zone is used. In a further embodiment, such a conventional tubular reactor is cooled by an external water jacket and has at least one injection point for initiator and/or monomer. Suitable, but not limiting, reactor lengths can be between 500 and 1500 meters. The autoclave reactor normally has several injection points for initiator and/or monomer. The particular reactor combination used allows conversion rates of above 20 percent, which is significantly higher than the conversion rates obtained for standard autoclave reactors, which allow conversion rates of about 16-18 percent, expressed as ethylene conversion, for the production of low density type of polymers.

Examples of suitable reactor systems are described in U.S. Pat. Nos. 3,913,698 and 6,407,191.

Monomers and Comonomers

The term ethylene copolymer as used in the present description and the claims refers to polymers of ethylene and one or more comonomers. Suitable comonomers to be used in the ethylene polymers of the present invention include, but are not limited to, any unsaturated organic compound containing at least one ethylenic unsaturation (e.g. at least one double bond), and at least one carbonyl group (—C═O). Representative unsaturated organic compounds that contain at least one carbonyl group are the ethylenically unsaturated carboxylic acids, anhydrides, esters and their salts, both metallic and nonmetallic. Preferably, the organic compound contains ethylenic unsaturation conjugated with the carbonyl group. Representative compounds include maleic, fumaric, acrylic, methacrylic, itaconic, crotonic, .alpha.-methyl crotonic, cinnamic, and the like, acids and their anhydride, ester and salt derivatives, if any. Acrylic acid and methacrylic acid are the preferred unsaturated organic compounds containing at least one ethylenic unsaturation and at least one carbonyl group.

Initiators

The process of the present invention is a free radical polymerization process. The type of free radical initiator to be used in the present process is not critical. Free radical initiators that are generally used for such processes are oxygen, which is usable in tubular reactors in conventional amounts of between 0.0001 and 0.005 weight percent (wt %) based on the weight of polymerizable monomer, and organic peroxides. Typical and preferred initiators are the organic peroxides such as peresters, perketals, peroxy ketones and percarbonates, di-tert-butyl peroxide, cumyl perneodecanoate, and tert-amyl perpivalate. Other suitable initiators include azodicarboxylic esters, azodicarboxylic dinitriles and 1,1,2,2-tetramethylethane derivatives. These organic peroxy initiators are used in conventional amounts of between 0.005 and 0.2 wt % based on the weight of polymerizable monomers.

Chain Transfer Agents

Chain transfer agents or telogens are used to control the melt flow index in a polymerization process. Chain transfer involves the termination of growing polymer chains, thus limiting the ultimate molecular weight of the polymer material. Chain transfer agents are typically hydrogen atom donors that will react with a growing polymer chain and stop the polymerization reaction of the chain. These agents can be of many different types, from saturated hydrocarbons or unsaturated hydrocarbons to aldehydes, ketones or alcohols. By controlling the concentration of the selected chain transfer agent, one can control the length of polymer chains, and, hence, the weight average molecular weight, $M_w$. The melt flow index (MFI or $I_2$) of a polymer, which is related to $M_w$, is controlled in the same way.

The chain transfer agents used in the process of this invention include, but are not limited to, aliphatic and olefinic hydrocarbons, such as saturated hydrocarbons of six or more carbon atoms (e.g., hexane, cyclohexane, octane, etc.), propene, pentene or hexene; ketones such as acetone, diethyl ketone or diamyl ketone; aldehydes such as formaldehyde or acetaldehyde; and saturated aliphatic aldehyde alcohols such as methanol, ethanol, propanol or butanol. Preferred chain transfer agents are those with a chain transfer constant (Cs) not in excess of 0.1 (e.g., MEK, propionaldehyde, tert-butanethiol), more preferably from 0.02 to 0.05 (e.g., propylene, isopropanol, 1-butene), and even more preferably from 0.002 to 0.02 (e.g., methanol, ethanol, isopropanol, acetone). The Cs is calculated as described by Mortimer at 130° C. and 1360 atmospheres (Ref. No. 1-4). The top Cs value typically does not exceed 25, more typically it does not exceed 21.

In one embodiment, the amount of chain transfer agent used in the process of the present invention is from 0.3 to 15 percent by weight, preferably from 1 to 10 percent by weight based on the amount of monomer introduced in the reactor system.

The manner and timing of the introduction of the CTA into the process of the invention can vary widely as long as the CTA and/or ethylene are freshly injected into at least two reaction zones. Typically the CTA is fed to the first reaction zone along with ethylene and other reaction components, e.g., comonomers, initiator, additives, etc., and make-up CTA, i.e., CTA replacement for the CTA consumed in the first reactor zone, is fed to a down stream ($2^{nd}$, $3^{rd}$, $4^{th}$, etc) reaction zone. The first reaction zone is an autoclave.

In one embodiment, additional (fresh) CTA is fed together with fresh ethylene through direct injection and/or along with the injected peroxide solution.

In one embodiment, additional (fresh) ethylene without CTA is fed as a make up flow for ethylene consumed in the first reaction zone either to the first autoclave reaction zone and/or to one or more down stream reaction zones.

In one embodiment, the fresh CTA is a CTA with a Cs higher than the Cs of the CTA fed to the first reaction zone.

In one embodiment, the CTA comprises a monomeric group, like propylene, butene-1, etc. The monomeric group enhances reactor conversion (it increases the consumption of comonomer).

In one embodiment, the CTA and/or operating conditions in the recycle sections are selected such that the CTA will condense and/or separate from the polymer product resulting in less CTA recycled back to the reactor inlet.

In one embodiment, CTA is purged from the reactor system in a downstream reaction zone.

In one embodiment, the reactor system comprises two autoclave reaction zones followed by two reaction tubular zones, and ethylene monomer and CTA are fed to both autoclave reaction zones but not to either tubular reaction zone.

In one embodiment, the reactor system comprises two autoclave reaction zones followed by two reaction tubular zones, and ethylene monomer and CTA are fed to both autoclave reaction zones but not to either tubular reaction zone, but initiator is fed to one or both tubular reaction zones.

In one embodiment, the CTA is the components injected to control molecular weight and melt-index of the product. Process impurities, such as peroxide dissociation products and peroxide diluent solvent, and comonomers are not CTA's, although their level in the process will influence the level of CTA system needed to control molecular weight and melt-index of the product.

Polymers

The ethylene-based polymers made according to the process of this invention can vary from film grade, with a very narrow molecular weight distribution (MWD), to coating type resins having a much broader MWD, by enhancing the production in the tube or in the autoclave when either a minor or a large degree of back mixing is needed. By polymerizing ethylene and comonomers in an autoclave reactor, one will get a polymer product having a broad molecular weight distribution, while the polymerization in a tubular reactor will give a polymer product having a narrow molecular weight distribution. Surprisingly, however, by using the split CTA addition process of this invention, the polymers can be prepared with high amounts of branching and a MWD narrower than polymers produced in a conventional autoclave polymerization but broader than polymers produced in a conventional tube reactor polymerization. In this way the molecular weight distribution of ethylene-based interpolymers can be adjusted with more flexibility than in a conventional autoclave reactor or in a conventional tubular reactor.

Representative of the interpolymers of ethylene and an alpha,beta-unsaturated carbonyl comonomer that can be made by the process of this invention are copolymers of ethylene and acrylic acid or methacrylic acid (EAA or EMAA) and their ionomers (e.g. their metal salts), ethylene and vinyl acetate (EVA) and its derivative ethylene vinyl alcohol (EVOH), ethylene and carbon monoxide (ECO), ethylene/propylene and carbon monoxide (EPCO), ethylene/carbon monoxide/acrylic acid terpolymer (ECOAA), and the like. With respect to EAA and EMAA (and their derivatives), these materials have carboxylic acid groups along the backbone and/or side chains of the copolymer which in the case of their ionomers, can be subsequently neutralized or partially neutralized with a base. Typically, these copolymers contain from 2 to 30, or from 3 to 20, or from 4 to 15, percent by weight of acid comonomer units in the polymer chain. The melt index of these copolymers is typically from 0.5 to 1500, or from 2 to 300, or from 5 to 50.

The ethylene-based interpolymers made according to this invention have the benefits of conversion as mentioned above. This distinguishes them from other ways of making similar ethylene polymers, being in a tubular process. In one aspect the polymer of this invention has a narrower MWD than other polymers made in similar reactors that do not use the split CTA concept (Z1/Zi=1). This exemplified and quantified with the melt elasticity-melt index balance, which is a sensitive method to show these differences as shown by the examples and comparative examples. It is also exemplified by the improvement in film optics associated narrow MWD.

In one embodiment, the ethylene-based interpolymers of this invention have a typical density from 0.920 to 0.960 grams per cubic centimeter (g/cc or g/cm$^3$). Blends The inventive interpolymers can be blended with one or more other polymers such as, but not limited to, other polyolefins.

Additives

One or more additives may be added to a composition comprising an inventive polymer. Suitable additives include, but are not limited to, stabilizers.

Uses

The polymer of this invention may be employed in a variety of conventional thermoplastic fabrication processes to produce useful articles, including objects comprising at least one film layer, such as a monolayer film, or at least one layer in a multilayer film prepared by cast, blown, calendered, or extrusion coating processes; molded articles, such as blow molded, injection molded, rotomolded or vacuum formed articles; extrusions (e.g., wire and cable coating); and woven or nonwoven fabrics. Film uses include, but are not limited to, adhesive films, clarity shrink films, collation shrink films, cast stretch films, silage films, stretch hood, sealants and diaper backsheets. Other uses include in coatings for metal (especially aluminum), as a sealing layer, and in dispersions and extrusion coatings. Compositions comprising the inventive polymer can also be formed into fabricated articles using conventional polyolefin processing techniques.

Other suitable applications for the inventive polymer include elastic films; soft touch goods, such as tooth brush handles and appliance handles; gaskets and profiles; adhesives (including hot melt adhesives and pressure sensitive adhesives); footwear (including shoe soles and shoe liners); auto interior parts and profiles; foam goods (both open and closed cell); impact modifiers for other thermoplastic polymers such as high density polyethylene, isotactic polypropylene, or other olefin polymers; coated fabrics; flooring; and viscosity index modifiers, also known as pour point modifiers, for lubricants.

Further treatment of the polymer of this invention may be performed for application to other end uses. For example, dispersions (both aqueous and non-aqueous) can also be formed using the present polymers or formulations comprising the same. Frothed foams comprising the inventive polymer can also be formed. The inventive polymer may also be crosslinked by any known means, such as the use of peroxide, electron beam, silane, azide, or other cross-linking technique. The inventive polymers can be further modified to form ionomers, such as reaction with sodium hydroxide or zinc oxide.

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, density, melt index, molecular weight, reagent amounts and process conditions.

The term "composition," as here used means a combination of two or more materials. With the respective to the inventive polymer, a composition is the inventive polymer in combination with at least one other material, e.g., an additive, filler, another polymer, catalyst, etc.

The terms "blend" or "polymer blend," as used, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined below.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" or "ethylene polymer" refers to a polymer that comprises a majority amount of polymerized ethylene based on the weight of the polymer and, optionally, may comprise at least one comonomer.

The term "ethylene-based interpolymer" or "ethylene interpolymer" refers to an interpolymer that comprises a majority amount of polymerized ethylene based on the weight of the interpolymer, and comprises at least one comonomer.

The term "acid comonomer units in the polymer chain" refers to units within a polymer chain derived from a comonomer containing at least one ethylenic unsaturation (e.g. at least one double bond), and at least one carbonyl group (—C=O).

The term "reactor zone," refers to a section of a reactor where a free radical polymerization reaction takes place by injecting an initiator system, which is able to decompose to radicals at the conditions within the zone. A reactor zone can be a separate reactor unit or a part of a larger reactor unit. In a tubular plug flow reactor unit, each zone begins where fresh initiator is injected. In an autoclave reactor unit, zones are formed by a separation device, e.g., a baffle, preventing back mixing. Each reactor zone may have its own initiator feed, while feeds of ethylene, comonomer, chain transfer agent and other components can be transferred from a previous reaction zone, and/or freshly injected (mixed or as separate components).

The term "zone reaction product" refers to the ethylene-based polymer made under high-pressure conditions (e.g., a reaction pressure greater than 100 MPa) through a free radical polymerization mechanism. This product typically includes not only the polymer molecules formed by the polymerization of the monomers and, optionally, comonomers, but also unreacted monomer and comonomer, CTA system, by-products and any other compounds or materials introduced or made in the reaction zone. Due to intermolecular hydrogen transfer, existing dead polymer molecules can be reinitiated, resulting in the formation of long chain branches (LCB) on the original (linear) polymer backbone. In a reactor zone, new polymer molecules are initiated, and a part of the polymer formed will be grafted on existing polymer molecules to form long chain branches.

The term "polymerization conditions" refers to process parameters under which the initiator entering the reactor zone will at least partly decompose into radicals, initiating the polymerization. Polymerization conditions include, for example, pressure, temperature, concentrations of reagents and polymer, residence time and distribution. The influence of polymerization conditions on the polymer product is well described and modeled in S. Goto et al, Ref No. 1.

The term "CTA system" includes a single CTA or a mixture of CTAs. A CTA system includes a molecule able to transfer a hydrogen radical to a growing polymer molecule containing a radical by which the radical is transferred to the CTA molecule, which can then initiate the start of a new polymer chain. CTA is also known as telogen or telomer. In a preferred embodiment of the invention, each CTA system comprises a single CTA.

The term "fresh CTA" refers to CTA fed to a reaction zone other than reaction zone 1.

The term "suction to a hyper compressor" refers to the final compressor prior to the reactor that brings one or more feed flows to reactor pressure from a lower pressure. The suction to a hyper compressor is the inlet configuration of this compressor.

The term "hyper compressor discharge" refers to the outlet configuration of the hyper compressor.

The term "cloud point pressure" is used herein, refers to the pressure, below which, the polymer solution of a fixed composition at a fixed temperature, separates into two liquid phases. Above this pressure, the polymer solution is a single liquid phase.

Test Methods

Polymer Testing Methods

Density:

Samples for density measurement are prepared according to ASTM D 1928. Samples are pressed at 190° C. and 30,000 psi for 3 minutes, and then at (21° C.) and 207 MPa for 1 minute. Measurements are made within one hour of sample pressing using ASTM D792, Method B.

Melt Index:

Melt index, or $I_2$, (grams/10 minutes) is measured in accordance with ASTM D 1238, Condition 190° C./2.16 kg. $I_{10}$ is measured with ASTM D 1238, Condition 190° C./10 kg.

Triple Detector Gel Permeation Chromatography (TDGPC):

High temperature 3Det-GPC analysis is performed on an Alliance GPCV2000 instrument (Waters Corp.) set at 145° C. The flow rate for the GPC is 1 mL/min. The injection volume is 218.5 μL. The column set consists of four Mixed-A columns (20-μm particles; 7.5×300 mm; Polymer Laboratories Ltd).

Detection is achieved by using an IR4 detector from Polymer ChAR, equipped with a CH-sensor; a Wyatt Technology Dawn DSP MALS detector (Wyatt Technology Corp., Santa Barbara, Calif., USA), equipped with a 30-mW argon-ion laser operating at λ=488 nm; and a Waters three-capillary viscosity detector. The MALS detector is calibrated by measuring the scattering intensity of the TCB solvent. Normalization of the photodiodes is done by injecting SRM 1483, a high density polyethylene with weight-average molecular weight (Mw) of 32,100 and polydispersity of 1.11. A specific refractive index increment (dn/dc) of −0.104 mL/mg, for polyethylene in TCB, is used.

The conventional GPC calibration is done with 20 narrow PS standards (Polymer Laboratories Ltd.) with molecular weights in the range 580-7,500,000 g/mol. The polystyrene standard peak molecular weights are converted to polyethylene molecular weights using $$M_{polyethylene} = A \times (M_{polystyrene})^B$$

with A≈0.39, B=1. The value of A is determined by using HDPE Dow 53494-38-4, a linear polyethylene homopolymer with Mw of 115,000 g/mol. The HDPE reference material is also used to calibrate the IR detector and viscometer by assuming 100% mass recovery and an intrinsic viscosity of 1.873 dL/g. The acid group is neutralized, e.g., silylated, prior to analysis.

Distilled "Baker Analyzed"-grade 1,2,4-trichlorobenzene (J. T. Baker, Deventer, The Netherlands), containing 200 ppm of 2,6-di-tert-butyl-4-methylphenol (Merck, Hohenbrunn, Germany), is used as the solvent for sample preparation, as well as for the 3Det-GPC experiments. HDPE SRM 1483 is obtained from the U.S. National Institute of Standards and Technology (Gaithersburg, Md., USA).

LDPE solutions are prepared by dissolving the samples under gentle stirring for three hours at 160° C. The PS standards are dissolved under the same conditions for 30 minutes. The sample concentration for the 3Det-GPC experiments is 1.5 mg/mL and the polystyrene concentrations 0.2 mg/mL.

A MALS detector measures the scattered signal from polymers or particles in a sample under different scattering angles θ. The basic light scattering equation (from M. Andersson, B. Wittgren, K.-G. Wahlund, Anal. Chem. 75, 4279 (2003)) can be written as $$\sqrt{\frac{Kc}{R_\theta}} = \sqrt{\frac{1}{M} + \frac{16\pi^2}{3\lambda^2}\frac{1}{M}Rg^2\sin^2\left(\frac{\theta}{2}\right)} \quad (2)$$

where $R_\theta$ is the excess Rayleigh ratio, K is an optical constant, which is, among other things, dependent on the specific refractive index increment (dn/dc), c is the concentration of the solute, M is the molecular weight, $R_g$ is the radius of gyration, and λ is the wavelength of the incident light. Calculation of the molecular weight and radius of gyration from the light scattering data require extrapolation to zero angle (see also P. J. Wyatt, Anal. Chim. Acta 272, 1 (1993)). This is done by plotting $(Kc/R_\theta)^{1/2}$ as a function of $\sin^2(\theta/2)$ in the so-called Debye plot. The molecular weight can be calculated from the intercept with the ordinate, and the radius of gyration from initial slope of the curve. The Zimm and Berry methods are used for all data. The second virial coefficient is assumed to be negligible. The intrinsic viscosity numbers are calculated from both the viscosity and concentration detector signals by taking the ratio of the specific viscosity and the concentration at each elution slice.

ASTRA 4.72 (Wyatt Technology Corp.) software is used to collect the signals from the IR detector, the viscometer, and the MALS detector. Data processing is done with in house-written Microsoft EXCEL macros.

The calculated molecular weights, and molecular weight distributions (?) are obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 daltons. The viscometer calibration can be accomplished using the methods described by the manufacturer or alternatively by using the published values of suitable linear standards such as Standard Reference Materials (SRM) 1475a, 1482a, 1483, or 1484a. The chromatographic concentrations are assumed low enough to eliminate addressing $2^{nd}$ viral coefficient effects (concentration effects on molecular weight).

Cloud Point Measurement

Cloud point measurement is described in Loos et al., "*Fluid Phase Equilibria in the System Polyethylene and Eth-* ylene. *Systems of Linear Polyethylene and Ethylene at High Pressures,*" Macromolecules 16(1983), 111-117.

Gel Measurement

Gels are defects in the film, and can be formed by a number of different factors, e.g., by phase separation in the reactor, or by extrusion, or from impurities, etc.). Reactor gels typically are not crosslinked or oxidized, and they have a different viscosity and/or acid content than the film in which they are carried. With EAA products, reactor gels are typically rich in the dimer of the acid (a Michael addition product). Gels give a grainy structure to the film, and are typically analyzed as large, medium, small and very small (micro) gels.

Gels are characterized by analyzing a film sample produced using an extruder equipped with an FTIR that has a microscope attachment. A camera gives a first crude number (total gel count), and FTIR analysis can distinguish between reactor gels and other gels formed from impurities, equipment, oxidization, thermal degradation, etc. One extruder for producing the film for analysis is a Model OCS ME 20 available from OCS Optical Control Systems GmbH, Wullener Feld 36, 58454 Witten, Germany equipped with a parameter standard screw, L/D 25/1, with a chrome coating. The extruder is operated at a compression ratio of 3/1. The feed zone is 10D, the transition zone is 3D and the metering zone is 12D. The cast film die is a ribbon die, 150×0.5 mm. An air knife is used to pin the film on the chill roll. The die, knife, chill rolls and winding unit are also available from OCS Optical. The gel counter is an OCS FS-3 or OCS FS-5 line gel counter consisting of a lighting unit, a CCD detector and an image processor with a gel counter software version 3.65e 1991-1999, all too available from OCS.

Gels are measured continuously by taking a stream of pellets from the process and transferring them to the cast film line. The film line uses a set temperature profile by product family (melt index). One analysis cycle inspects 24.6 cm$^3$ of film. The corresponding area is 0.324 m$^2$ for a film thickness of 76 microns and 0.647 m$^2$ for a film thickness of 38 microns. The gels are reported by size per 50,000 square inches of film. The gel classifications are as follows:

Large gel: >1600 microns in size
Medium gel: 800 to 1600 microns
Small gel: 400 to 800 microns
Very small (micro) gels: 200 to 400 microns Acid Content The percent by weight of acid comonomer units in the polymer chain may be analyzed by titration or using an FTNIR technique.

EXPERIMENTAL

Calculations for Z1, Z2 and Zi

The "reactor zone molar concentration of a CTA j in a reactor zone i ([CTA]ji)" is defined as the "total molar amount of that CTA freshly injected (recycled CTA and/or make-up CTA) to reactor zones 1 to i" divided by the "total molar amount of ethylene freshly injected to reactor zones 1 to i." This relationship is shown below in Equation A.

$$[CTA]_{j_i} = \frac{\sum_{k=1}^{i} n_{CTA,j_k}}{\sum_{k=1}^{i} n_{eth_k}} \quad \text{(Eqn. A)}$$

In Equation A, $j \geq 1$, $n_{CTA,j_i}$ is the "amount of moles of the jth CTA freshly injected to the ith reactor zone," and $n_{eth_i}$ is the "amount of moles of ethylene freshly injected to the ith reactor zone."

The "transfer activity of a CTA (system) in a reactor zone i" is defined as the "sum of the reactor zone molar concentration of each CTA in the reactor zone" multiplied with its chain transfer activity constant (Cs). The chain transfer activity constant (Cs) the ratio of reaction rates Ks/Kp, at a reference pressure (1360 atm) and a reference temperature (130° C.). This relationship is shown below in Equation B, where $n_{comp}i$ is the total number of CTAs in reactor zone i.

$$Z_i = \sum_{j_i=1}^{n_{comp,i}} [CTA]_{j_i} \cdot C_{s,j} \quad \text{(Eqn. B)}$$

Thus, the ratio Z1/Zi is shown below in Equation C.

$$\frac{Z_1}{Z_i} = \frac{\sum_{j_i=1}^{n_{comp,1}} [CTA]_{j_1} \cdot C_{s,j}}{\sum_{j_i=1}^{n_{comp,i}} [CTA]_{j_i} \cdot C_{s,j}} \quad \text{(Eqn. C)}$$

The chain transfer constant (Cs) values for some chain transfer agents are shown below in Table 1, showing chain transfer constants (Cs) derived by Mortimer at 130° C. and 1360 atm for example chain transfer agents.

TABLE 1

Cs-Values as Measured by Mortimer at 130° C. and 1360 atm in References 2 and 3

| CTA | Cs at 130° C. and 1360 atm |
|---|---|
| propane | 0.0030 |
| iso-butane | 0.0072 |
| propylene | 0.0122 |
| iso-propanol | 0.0144 |
| acetone | 0.0168 |
| 1-butene | 0.047 |
| methyl ethyl ketone | 0.060 |
| propionaldehyde | 0.33 |
| tert-butanthiol | 15 |

1. G. Mortimer; Journal of Polymer Science: Part A-1; Chain transfer in ethylene polymerization; vol 4, p 881-900 (1966)
2. G. Mortimer; Journal of Polymer Science: Part A-1; Chain transfer in ethylene polymerization. Part Iv. Additional study at 1360 atm and 130° C.; vol 8, p1513-1523 (1970)
3. G. Mortimer; Journal of Polymer Science: Part A-1; Chain transfer in ethylene polymerization. Part V, The effect of temperature; vol 8, p1535-1542 (1970)
4. G. Mortimer; Journal of Polymer Science: Part A-1; Chain transfer in ethylene polymerization. Part VII. Very reactive and depletable transfer agents; vol 10, p163-168 (1972)

When only one CTA is used in the total reactor system, Equations B and C simplify to Equations D and E, respectively.

$$Z_i = [CTA]_i \cdot C_s \quad \text{(Eqn. D)}$$

$$\frac{Z_1}{Z_i} = \frac{[CTA]_1 \cdot C_s}{[CTA]_i \cdot C_s} = \frac{[CTA]_1}{[CTA]_i} \quad \text{(Eqn. E)}$$

Although all the examples reported below use two-zone autoclave reactors, those skilled in the art understand that multi-zone reactor systems comprising a first zone of an autoclave reactor followed by a single or multiple zone autoclave or tube reactor, or combinations of the two reactors, can also be employed.

For the eight polymerizations (three inventive, five comparative) discussed below, only one CTA was used per polymerization.

Only one CTA implies that Cs drops out of equations, and thus, Equation E is used for all examples, as shown below.

$$\frac{Z_1}{Z_2} = \frac{[CTA]_1 \cdot C_s}{[CTA]_2 \cdot C_s} = \frac{[CTA]_1}{[CTA]_2} = \frac{\sum_{k=1}^{1} n_{CTA_k}}{\sum_{k=1}^{1} n_{eth_k}} \cdot \frac{\sum_{k=1}^{2} n_{eth_k}}{\sum_{k=1}^{2} n_{CTA_k}}$$

$$= \frac{\sum_{k=1}^{2} n_{eth_k}}{\sum_{k=1}^{1} n_{eth_k}} \cdot \frac{\sum_{k=1}^{1} n_{CTA_k}}{\sum_{k=1}^{2} n_{CTA_k}} = \frac{n_{eth_1} + n_{eth_2}}{n_{eth_1}} \cdot \frac{n_{CTA_1}}{n_{CTA_1} + n_{CTA_2}}$$

In addition, the tubular part of the AC/tube reactor system (which is the system used to generate all examples) can be considered as reactor zones 3 and 4, where both zones do not receive any additional freshly injected ethylene or CTA. This means that Equation E becomes as shown below. So $Z_1/Z_4 = Z_1/Z_3 = Z_1/Z_2$.

$$\frac{Z_1}{Z_i} = \frac{[CTA]_1 \cdot C_s}{[CTA]_i \cdot C_s} = \frac{[CTA]_1}{[CTA]_i} = \frac{\sum_{k=1}^{1} n_{CTA_k}}{\sum_{k=1}^{1} n_{eth_k}} \cdot \frac{\sum_{k=1}^{i} n_{eth_k}}{\sum_{k=1}^{i} n_{CTA_k}}$$

$$= \frac{\sum_{k=1}^{i} n_{eth_k}}{\sum_{k=1}^{1} n_{eth_k}} \cdot \frac{\sum_{k=1}^{1} n_{CTA_k}}{\sum_{k=1}^{i} n_{CTA_k}} = \frac{\sum_{k=1}^{2} n_{eth_k}}{\sum_{k=1}^{1} n_{eth_k}} \cdot \frac{\sum_{k=1}^{1} n_{CTA_k}}{\sum_{k=1}^{2} n_{CTA_k}} = \frac{Z_1}{Z_2}, i \geq 3$$

In addition, for all examples: $n_{eth_1} = n_{eth_2}$, and thus, the relationship is further simplified as shown below.

$$\frac{Z_1}{Z_2} = \frac{n_{eth_1} + n_{eth_2}}{n_{eth_1}} \cdot \frac{n_{CTA_1}}{n_{CTA_1} + n_{CTA_2}}$$

$$= \frac{n_{eth_1} + n_{eth_1}}{n_{eth_1}} \cdot \frac{n_{CTA_1}}{n_{CTA_1} + n_{CTA_2}}$$

$$= 2 \cdot \frac{n_{CTA_1}}{n_{CTA_1} + n_{CTA_2}}$$

Conditions in an Autoclave Top Zone

The typical autoclave top zone conditions for EAA 3440 are 2137 bar and 215° C. The polymer made in the first zone has on average 11 wt % acrylic acid (AA). Non-perfect mixing in the autoclave top zone results in a colder subzone near the cold ethylene/AA inlet. This colder subzone is characterized by lower temperature, lower polymer concentration, higher AA concentration, and polymer with a higher AA content (>11 wt % AA). These conditions promote local occurrence of phase separation in the top zone. Phase separation is indicated by the gel level and is influenced by solvent concentration, temperature and/or pressure conditions. The agitator shows deposits of solid EAA in the upper part of the top zone of the autoclave, where the Ethylene/AA entry is located. Characterization of this material using FTIR technique described above shows that this material is also present in gels.

Ethylene/EAA Phase Separation Data (Cloud Point) from External Literature

Literature reference: Carsten Beyer and Lothar R. Oellrich, "Solvent studies with the system Ethylene/Poly(ethylene-co-acrylic acid): Effects of solvent, density, hydrogen bonding, and copolymer composition," Helvetica Chimica Acta; Vol. 85 (2002); pp 659-670. (See also, Loos et al., described above.)

Table 2 shows the impact of AA content in the polymer on cloud point pressure for ethylene/polyethylene (95/5 wt %) systems. A solvent was not used in these systems of Table 2.

TABLE 2

Impact of AA Content in Polymer on Cloud Point Pressure

| EAA, wt % | 0 | 5 | 5 | 5 | 5 | 5 | 5 |
|---|---|---|---|---|---|---|---|
| AA content in EAA, wt % | 0 | 6 | 7.5 | 8 | 9 | 11 | 15 |
| LDPE, wt % | 5 | | | | | | |
| Ethylene, wt % | 95 | 95 | 95 | 95 | 95 | 95 | 95 |

| Temperature, ° C. | Cloud point pressure, bar | | | | | | |
|---|---|---|---|---|---|---|---|
| 150.5 ± 0.5 | 1529 | 2153 | | | | | |
| 174.5 ± 0.6 | 1421 | 1779 | 1946 | 2037 | 2209 | | |
| 200.5.5 ± 2 | 1341 | 1539 | 1637 | 1692 | 1779 | 2104 | 2647 |
| 224.5 ± 0.5 | 1272 | 1394 | 1442 | 1469 | 1521 | 1686 | 2066 |
| 249.5 ± 1 | 1221 | 1302 | 1340 | 1349 | 1390 | 1484 | 1732 |

As seen from Table 2, cloud point pressure increases strongly with decreasing temperature and/or increasing AA content in polymer.

Additional Ethylene/EAA Phase Separation Data

The properties of the EAA copolymer are shown in Table 3. Cloud point pressure as a function of solvent is shown in Table 4.

TABLE 3

Properties of Investigated Polymer

| | | EAA Copolymer | | | | |
|---|---|---|---|---|---|---|
| | | 10 | 30 | 40 | 60 | 04 |
| AA content | wt % | 9.7 | 9.7 | 9.7 | 9.7 | 9.7 |
| Melt index | gr/10 min | 1.8 | 4.8 | 10.0 | 19.5 | 8.5 |

TABLE 4

Cloud Point Pressure as a Function of Solvent

| | 1 | 2 | 3 | 4 |
|---|---|---|---|---|
| System | w % | w % | w % | w % |
| EAA 10 | 15 | 15 | 16 | 16 |
| AA content in EAA 10, wt % | | | 9.7 | |
| Ethylene | 85 | 75 | 75 | 75 |
| Isobutane | 0 | 10 | | |
| Ethanol | | | 9 | |
| Acetone | | | | 9 |

TABLE 4-continued

Cloud point data

| Temperature (° C.) | Pressure (bar) | | | |
|---|---|---|---|---|
| 180 ± 1.55 | 1990 | 2066 | 1356 | 1434 |
| 197.5 ± 1.5 | 1688 | 1744 | 1252 | 1323 |

Table 4 shows the impact of a solvent on cloud point pressure. The conditions shown in Table 4 are the closest to the conditions in the autoclave top zone. Although the AA content is still a little lower (9.7 versus 11 wt % AA), the EAA concentration is at the high side (15-16 wt % versus 13.5 wt %), and there is no AA monomer present. Furthermore, in plant systems low levels of solvent (diluent for peroxides) and isobutane (CTA) are present.

Cloud point pressure as a function of AA comonomer is shown in Table 5. As shown in Table 5, the "3 wt % iso-octane" neutralizes the negative impact of "4 wt % AA" on cloud point pressure.

TABLE 5

Impact of Solvent and AA on Cloud Point Pressure

| System | w % | w % | w % |
|---|---|---|---|
| EAA 10, wt % | 10.1 | 10 | 10 |
| AA content in EAA, wt % | 9.7 | 9.7 | 9.7 |
| Ethylene, wt % | 89.9 | 86.6 | 89.9 |
| 2,2,4 trimethylpentane, wt % | 0 | 3.4 | 2.8 |
| Acrylic acid, wt % | 0 | 0 | 4.2 |

Cloud point data

| Temperature (° C.) | Pressure (bar) | Pressure (bar) | Pressure (bar) |
|---|---|---|---|
| 220 ± 0.5 | 1920 | 1815 | 1924 |

Some solvents and their properties are shown in Table 6.

TABLE 6

Properties and Compositions of Selected Solvents

| | Boiling range (° C.) | Density at 15° C. (kg/dm3) | Major components |
|---|---|---|---|
| 2,2,4-trimethylpentane | 99.3 | 0.688 | 2,2,4 trimethylpentane (iso-octane) |
| Isopar-C | 98-104 | 0.698 | >80% 2,2,4 trimethylpentane |

TABLE 6-continued

Properties and Compositions of Selected Solvents

| | Boiling range (° C.) | Density at 15° C. (kg/dm3) | Major components |
|---|---|---|---|
| Isopar-H | 179-188 | 0.758 | plus other C6-C9 isoparaffins C11-C13 isoparaffins |

The solvent type was changed at an EAA polymerization from Isopar-C (mainly 2,2,4-trimethylpentane) to Isopar-H, as peroxide dilution solvent. Isopar-H, being a heavier boiling solvent, will more easily condense and remove from the polymerization system as compared to Isopar-C. Thus, a lower level of Isopar-H will build up in the polymerization process. The lower amount of Isopar-H, means that a higher amount of isobutane (CTA) is needed to control the melt-index of the polymer product.

Isobutane will compensate for the lower solvent content in the polymerization process. Isobutane will replace the condensed solvent (Isopar-H) as CTA. The reduced solvent level, the in case of Isopar-H, results in a critical cloud point pressure increase, by which phase separation conditions are reached in the top zone. The consequence is an increased gel level in the polymer product. In Tables 7 and 8, the impact of the solvent change on CTA amount and gel levels, respectively, is shown.

TABLE 7

Process Conditions and CTA Content for Various Products (ISOPAR C and H)

| EAA name | MI g/10 min. | AA content wt. % | Solvent | Pressure bar | Control temperature AC-zone 1 ° C. | Control temperature AC-zone 2 ° C. | CTA Isobutane vol % |
|---|---|---|---|---|---|---|---|
| 40 | 10.0 | 9.7 | Isopar C | 2137 | 215 | 233 | 1.9 |
| 40 | 10.0 | 9.7 | Isopar H | 2137 | 215 | 233 | 2.4 |
| 30 | 4.8 | 9.7 | Isopar C | 2137 | 210 | 240 | 1.1 |
| 30 | 4.8 | 9.7 | Isopar H | 2137 | 210 | 240 | 1.5 |
| 04 | 8.5 | 9.7 | Isopar C | 2137 | 215 | 233 | 1.7 |
| 04 | 8.5 | 9.7 | Isopar H | 2137 | 215 | 233 | 2.3 |

Table 7 shows that the polymer MI is control by isobutane content in case of solvent change from Isopar C to Isopar H. As shown in Table 7, on average the increase in isobutane level was 0.5 vol %, when the solvent is changed from Isopar C to Isopar H. As shown in table 8, Isopar C gave lower small and micro gel levels as compared with the polymerization using Isopar H. This indicates that the use of Isopar C, as a peroxide diluent solvent, reduces CP pressure.

TABLE 8

Zone 1 Temperature Profile and Product Gel Count

| EAA | Solvent | Zone 1 temperature profile, C. | | | | Average gel count per 50,000 square inches | | | |
|---|---|---|---|---|---|---|---|---|---|
| | | Top of zone | Top middle | Middle bottom | Bottom | Large | Medium | Small | Micro |
| 40 | Isopar C | 211.6 | 212.6 | 212.1 | 215.0 | 0.3 | 8.7 | 405 | 19893 |
| 40 | Isopar H | 212.0 | 213.1 | 212.8 | 215.0 | 0.3 | 14.7 | 544 | 22203 |
| 30 | Isopar C | 206.7 | 207.7 | 207.2 | 210.9 | 0.3 | 32.8 | 347 | 11995 |
| 30 | Isopar H | 206.4 | 208.0 | 208.0 | 211.0 | 0.6 | 34.4 | 473 | 30541 |

TABLE 8-continued

Zone 1 Temperature Profile and Product Gel Count

| | | Zone 1 temperature profile, C. | | | Average gel count per 50,000 square inches | | | |
|---|---|---|---|---|---|---|---|---|
| EAA | Solvent | Top of zone | Top middle | Middle bottom | Bottom | Large | Medium | Small | Micro |
| 04 | Isopar C | 212.1 | 212.8 | 212.0 | 214.9 | 0.1 | 14.4 | 280 | 15734 |
| 04 | Isopar H | 211.8 | 213.1 | 212.7 | 215.0 | 0.6 | 22.9 | 600 | 28310 |

The top of zone 1 is a cold spot that is several degrees colder than the control temperature.

Table 9 shows the effect of solvent change on cloud point pressure using Mortimer chain transfer data from Table 10. The increase in isobutane demand as CTA can be assigned to a loss in solvent build up level. The increase in isobutane level is calculated in Table 9 as a loss in 2,2,4-trimethylpentane. In the calculation it is assumed that "1 wt % Isopar-C" and "1 wt % Isopar-H" have the same impact on cloud point pressure, and have the same chain transfer activity. The increase on cloud point pressure of 41 bar is calculated by taking into consideration the impact of isobutane and the loss in solvent concentration on the cloud point pressure.

TABLE 9

Calculated Impact of Solvent Change on Cloud Point pressure

| | Isobutane | Equivalent CTA Activity to Isobutane 2,2,4-trimethylpentane | | CP Increase by Isobutane | CP Increase by Solvent Change |
|---|---|---|---|---|---|
| | vol % | vol %* | wt % | bar/wt %** | bar |
| Delta iso-butane | 0.5 | 0.56 | 1.11 | 37 | 41 |

Note
*Using Cs values of Mortimer

Note
**Combined effect of iso-octane (31 bar/wt %) and isobutane (−6 bar/wt %)

TABLE 10

Chain Transfer Data by Mortimer

| Chain transfer agent | Cs at 130° C. & 1360 atm |
|---|---|
| Ethyl acetate | 0.0045 |
| 2,4,4 Trimethylpentane | 0.0064 |
| iso-butane | 0.0072 |
| ethanol | 0.0075 |
| iso-propanol | 0.0144 |
| acetone | 0.0168 |
| methyl ethyl ketone | 0.06 |

Polymerization Simulations

Polymerization simulations were achieved with Goto LDPE simulation model as described in: S. Goto et al; *Journal of Applied Polymer Science: Applied Polymer Symposium*, 36, 21-40, 1981 (Title: Computer model for commercial high pressure polyethylene reactor based on elementary reaction rates obtained experimentally).

The chain transfer activity data is from Mortimer, as described in the following references:

1. G. Mortimer; *Journal of Polymer Science: Part A-1*; Chain transfer in ethylene polymerization; vol. 4, p 881-900 (1966), and
2. G. Mortimer; *Journal of Polymer Science: Part A-1*; Chain transfer in ethylene polymerization. Part V. The effect of Temperature; vol. 8, p1535-1542 (1970).

A two zone high pressure autoclave reactor using respectively isobutane, ethanol, acetone and methyl ethyl ketone as chain transfer agent is employed.

| Residence time: | $1^{st}$ AC zone: | 26 sec |
|---|---|---|
| | $2^{nd}$ AC zone: | 27 sec |

Ratio $1^{st}$ AC zone fresh feed stream versus $2^{nd}$ AC zone feed stream is 1

| Pressure level: | | 2137 bar | |
|---|---|---|---|
| AC zone control temperature: | | $1^{st}$ AC zone: | 210° C. |
| | | $2^{nd}$ AC zone: | 233° C. |
| Simulated product: | Melt-index: | 10 gr/10 min | |
| | AA content: | 9.7 wt % | |

The temperature, conversion levels, and distribution of ethylene and AA, as shown in Table 11, results in a polymer with a final acid content of 11 wt % in the autoclave top zone, and an acid content of 9.7 wt % in the final polymer product. Based on ethylene and AA flows and temperature conditions, the conversion and polymer composition can be calculated in each zone.

TABLE 11

Acid Compositions for EAA 40

| | Reactor conditions | | | | Polymer composition | | |
|---|---|---|---|---|---|---|---|
| | Tfeed | Tcontrol | AA conv | Ethy conv* | kg AA | kg Eth | wt % AA |
| AC-zone 1 | 35 | 210 | 0.94 | 0.135 | 245 | 1984 | 11.0% |
| AC-zone 2 | 28 | 233 | 0.94 | 0.155 | 245 | 2585 | 8.7% |
| Final product | | | | | 491 | 4569 | 9.7% |

Note
*Ethylene conversion is calculated by 13° C. temperature increase per 1 wt % ethylene conversion The fresh ethylene and fresh AA are equally distributed over both zones. The simulated polymerizations, additional conditions, are also shown in Table 13. Simulation results are with Goto model and Mortimer chain transfer activity of application of invention with different CTA's. Simulations were performed at EAA 40 conditions. "2.4 vol % isobutene" was replaced by other type of CTA's. Cloud point reduction was derived from CTA concentration in top zone and cloud point reduction data measured (bar/wt %). Isobutane shows a negative effect due to its lower density.

As shown in Table 12, the additional lowering of cloud point pressure is achieved by using an inventive process (CTA split). Furthermore the inventive process shows a lowering of the molecular weight of the polymer formed in AC-zone 1. This lower molecular weight in AC-zone-1 improves polymer solubility as well as improved mixing efficiency, by which the colder subzone phase separation will be reduced. The reduced or eliminated phase separation will results in a polymer product with reduced gel levels, and which can be used to form films with improved optical properties.

Simulation Procedure

The process conditions and the dimensions of the reactor were entered into the model. Xn in Table 12 stands for number average degree of polymerization and reflects the number of monomer and comonomer units built in per average final polymer molecule. The melt index is calculated from Xn.

The observed isobutane concentration was taken for the reference isobutane case.

The chain transfer activity from process impurities and the acrylic acid comonomer were simulated by matching the product melt-index by assigning chain transfer activity to acrylic acid and simulating the remainder effect by process impurities by incorporating a low level of n-butane (used as model component) to the system. In the remainder of the simulations the chain transfer activity provided by the acrylic acid and process impurities was kept constant.

Only the observed level of 2.4 vol % isobutane was replaced by alternative CTA's.

All CTA's were simulated by Cs values and temperature dependences as derived by Mortimer (see Ref 1-4).

embodiments, this detail is for the primary purpose of illustration. Many variations and modifications can be made by one skilled in the art without departing from the spirit and scope of the invention as described in the following claims.

What is claimed is:

1. A high pressure polymerization process to form an ethylene-based interpolymer, the process comprising the steps of:
   A. Injecting a first feed comprising a chain transfer agent system (CTA system) and ethylene into a first autoclave reactor zone operating at polymerization conditions to produce a first zone reaction product, the CTA system of the first reactor zone having a transfer activity Z1; and
   B. (1) Transferring at least part of the first zone reaction product to a second reactor zone selected from a second autoclave reactor zone or a tubular reactor zone and operating at polymerization conditions, and, (2) freshly injecting, a feed, comprising ethylene, into the second reactor zone to produce a second zone reaction product, with the proviso that the CTA system of the second reactor zone has a transfer activity of Z2; and
   with the proviso that the ratio of Z1:Z2 is greater than 1, and
      wherein at least one comonomer is injected into the polymerization process at one or more of the following locations: at a suction to a hyper compressor, at a hyper compressor discharge, directly into a autoclave reactor at one or more zones, or directly into a tubular reactor at one or more zones, and
      wherein the at least one comonomer comprises at least one carboxylic acid group or an anhydride group, and
      wherein, if a CTA is a saturated hydrocarbon, then it comprises at least 6 carbon atoms.

2. The process of claim 1, further comprising one or more steps of transferring a zone reaction product produced in an

TABLE 12

Simulation Results with Different CTAs
Reactor pressure, bar 2137
Temperature, AC-zone 1 210° C.
Temperature, AC-zone 2 233° C.
AA wt % in EAA 9.7
Melt-index, 10 g/min 10

|  | CTA conc ratio Z1/Z2 | CTA-conc. top-zone [mol-ppm] | CTA-conc. bottom-zone [mol-ppm] | Xn* in top zone Monomer units | Estimated MI in AC-zone 1 | Xn final (10MI) | ΔP in CP per wt % cosolvent** bar | CP reduction by CTA bar | Additional CP reduction (by CTA) by invention bar |
|---|---|---|---|---|---|---|---|---|---|
| iso-butane reference (comparative) | 1.000 | 24000 | 24000 | 587 | 7.0 | 564 | −6 | −30 |  |
| iso-butane (comparative) | 1.150 | 28400 | 21000 | 565 | 9.9 | 564 | −6 | −35 | −5 |
| Ethanol reference (comparative) | 1.000 | 24000 | 24000 | 585 | 7.4 | 564 | 44 | 219 |  |
| Ethanol inventive | 1.150 | 28400 | 21000 | 563 | 10.1 | 564 | 44 | 259 | 40 |
| Acetone reference (comparative) | 1.000 | 25400 | 12700 | 582 | 7.7 | 564 | 41 | 216 |  |
| Acetone inventive | 1.150 | 30000 | 22200 | 559 | 10.8 | 564 | 41 | 255 | 39 |
| MEK reference (comparative) | 1.000 | 4950 | 4950 | 577 | 8.3 | 564 | 33 | 42 |  |
| MEK inventive | 1.150 | 5800 | 4290 | 555 | 11.4 | 564 | 33 | 49 | 7 |

*Definition of Xn: (co)monomer units incorporated into polymer.
**Cloud point reduction of MEK is derived from acetone on a molar basis of ketone functional group. For example, the CP reduction for MEK = CP reduction acetone × Mw acetone/Mw MEK = 41 × 58/72 = 33 bar/wt % MEK The direct consequence of the CTA arrangement of the invention leads to a narrower MWD, and the inventive polymers should have lower melt elasticity which translates to better optics in the films formed from such polymers.

Although the invention has been described with certain detail through the preceding description of the preferred (ith−1) reaction zone to an (ith) reaction zone, where 3≤i≤n, and n≥3, each zone operating at polymerization conditions, and injecting an (ith) feed comprising a CTA system into the (ith) reaction zone, the CTA system of the (ith) reaction zone having a transfer activity of Zi; and with the proviso that the ratio of Z1/Zi is greater than 1.

3. The process of claim 1, in which the second feed further comprises fresh CTA.

4. The process of claim 1, in which the at least one comonomer is selected from acrylic acid, methacrylic acid, or a combination thereof.

5. The process of claim 1, in which at least part of the first zone reaction product is transferred to a second autoclave reactor zone.

6. The process of claim 1, in which at least part of the first zone reaction product is transferred to a tubular reactor zone.

7. The process of claim 1, in which each feed to each reactor zone contains the same CTA.

8. The process of claim 1, in which each CTA is independently one of an olefin, an aldehyde, a ketone, an alcohol, a saturated hydrocarbon, an ether, a thiol, a phosphine, an amino, an amine, an amide, an ester, and an isocyanate.

9. The process of claim 1, in which at least one polymerization condition in at least one reactor zone is different from the other polymerization conditions.

10. The process of claim 1, in which each of the polymerization conditions in the reactor zones, independently, comprises a temperature greater than, or equal to, 100° C., and a pressure greater than, or equal to, 100 MPa.

11. The process of claim 2, in which the ratio $Z1/Z2$ and each ratio $Z1/Zi$ are greater than 1.03.

* * * * *